United States Patent [19]
Hodge

[11] Patent Number: 6,165,240
[45] Date of Patent: Dec. 26, 2000

[54] FAN-FOLD FILTER FOR A FORCED AIR VENTILATION SYSTEM

[76] Inventor: Joseph Hodge, P.O. Box 652, Owensville, Ohio 45160

[21] Appl. No.: 09/412,109

[22] Filed: Oct. 5, 1999

Related U.S. Application Data

[60] Division of application No. 08/900,792, Jul. 25, 1997, Pat. No. 5,989,303, which is a continuation-in-part of application No. 08/697,055, Aug. 19, 1996, abandoned.

[51] Int. Cl.⁷ .................................................. B01D 27/06
[52] U.S. Cl. ............................................... 55/497; 55/521
[58] Field of Search .......................... 55/497, 486, 521, 55/493, 501, 495, 528, DIG. 31, DIG. 35, DIG. 5, DIG. 39; 96/15, 17, 55, 57, 58, 233; 95/281

[56] References Cited

U.S. PATENT DOCUMENTS

| | | | |
|---|---|---|---|
| 1,854,569 | 4/1932 | Welch | 96/262 |
| 3,040,501 | 6/1962 | Pietsch | 55/550 |
| 3,458,130 | 7/1969 | Juhlin | 55/511 X |
| 3,494,113 | 2/1970 | Kinney | 55/481 |
| 4,104,170 | 8/1978 | Nedza | 55/528 X |
| 4,323,374 | 4/1982 | Shinagawa et al. | 55/521 X |
| 4,418,662 | 12/1983 | Engler et al. | 55/515 X |
| 4,514,197 | 4/1985 | Armbruster | 96/138 |
| 4,518,402 | 5/1985 | Dargel | 55/501 X |
| 4,724,749 | 2/1988 | Hedrick | 55/355 X |
| 4,827,901 | 5/1989 | Jackson et al. | 55/467.1 X |
| 4,904,288 | 2/1990 | d'Augereau | 55/487 X |
| 5,129,929 | 7/1992 | Linnersten | 55/521 X |
| 5,240,479 | 8/1993 | Bachinski | 55/521 X |
| 5,302,354 | 4/1994 | Watvedt et al. | 55/521 X |
| 5,306,321 | 4/1994 | Osendorf | 55/487 |
| 5,332,426 | 7/1994 | Tang et al. | 55/521 X |
| 5,350,620 | 9/1994 | Sundet et al. | 55/527 X |
| 5,470,363 | 11/1995 | Leader et al. | 55/385.2 X |
| 5,501,794 | 3/1996 | Van de Graaf et al. | 55/497 X |
| 5,505,852 | 4/1996 | van Rossen | 55/521 X |
| 5,525,145 | 6/1996 | Hodge | 55/495 |
| 5,620,503 | 4/1997 | Miller et al. | 96/233 X |

OTHER PUBLICATIONS

"Models 901KAX, 908C & 902B Air Cleaners", Brochure by Bryant Heating & Cooling Systems, 1193 BDP Co.
"Choose What's Right For You Indoor Air Quality Options", Brochure by Honeywell, Mar. 1992.
"Nothing To Sneeze AT.", Brochure by Honeywell, Nov. 1994.
"Service Manual for the Vertrod Thermal Impulse Heat Sealer", Service Manual And Reference Guide by Vertrod Copr., undated.
"The Vertrod Guide To Thermal Impulse Heat Sealing Machinery", Guide Book by Vertrod Corp., 47 pages, Jan. 1994.

*Primary Examiner*—Richard L. Chiesa
*Attorney, Agent, or Firm*—Steven J. Rosen

[57] ABSTRACT

A filter apparatus for use in a forced air ventilation system, the filter apparatus having a first fan folded sheet of a washable first type of filter material, a second fan folded sheet of a second type of filter material, and fanfolds of the first and second fan folded sheets are substantially equally shaped and folded together such that the fanfolds of the first and second fan folded sheets are interdigitated to form a filter material assembly. The first type of filter material is preferably an electrostatically self-charging washable material such as woven polypropylene and the second type of filter material is preferably disposable and contains activated charcoal. The filter material assembly may be removably disposed in a rectangular filter frame for mounting the filter material assembly in the forced air system. The filter frame has at least one crank shaft rotatably disposed between two opposed side walls which are between an open front end and an open back end of the frame. The crank shaft has cranks that are engageable with and substantially conforming to the fanfolds of the filter material assembly.

10 Claims, 6 Drawing Sheets

FAN-FOLD FILTER FOR A FORCED AIR VENTILATION SYSTEM

BACKGROUND OF THE INVENTION

This patent is a divisional of application 08/900,792 filed Jul. 25, 1997, now U.S. Pat. No. 5,989,303, is a continuation in part of U.S. patent application Ser. No. 08/697,055, filed Aug. 19, 1996, now abandoned.

FIELD OF THE INVENTION

This invention relates generally to air filters in forced air ventilation systems of heating and air conditioning systems and, more particularly, to a self-charging electrostatic fan-fold filter apparatus used in a return duct of such a forced air ventilation system.

DESCRIPTION OF RELATED ART

Conventional forced air ventilation systems in heating and air conditioning systems provide an air filtering apparatus at one location proximate the air handler or blower within what is referred to as the return ducting portion of the system. Some designs have incorporated wall or return register mounted filters at the inlet ends of return ducting leading to the blower. Typically, replaceable, flat, panel-type filters have been employed in central air conditioning and heating systems for use in the home, office, and other commercial buildings. These panel-type filters are supported in rectangular frames in the air flow passageway of the system and may be employed in banks of one or more filters, as desired. Some systems provide an air filtering apparatus end of the return duct portion of the system if there is only one return or inlet to the return duct. The area of the filter material is limited by the cross-sectional area of the duct that the filter is disposed in. Usually, a large sheet of filter material is used that is either disposable or washable, the latter requiring a hosing down and, being generally difficult to wash, because of its size. Electrostatic filters made of woven material such as polypropylene for use in a furnace proximate an air handler have surface areas limited by the duct cross-sectional area. Corrugated filters, which increase available filter surface area, generally have a support material embedded with electrostatic dust attracting fibers and are relatively stiff and not washable. Examples of some of these types of electronic, electrostatic, and mechanical air filter apparatus may be seen in the Bryant pamphlet on Models 901KAX, 908C & 902B Air Cleaners referenced herein as well as U.S. Pat. No. 3,494,113 entitled "AIR FILTER ASSEMBLY AND SUB-ASSEMBLIES" by William L. Kinney.

Single filter assemblies have been proposed which provides filter media in a pleated or fan-fold arrangement forming a plurality of downstream extending pockets therein which increases the effective filter area for a single filter panel. However, problems have been encountered with the newer pleated, pocketed type filter assemblies inasmuch as the nature of the arrangement of the filter media therein in the pleated, pocketed configuration renders the assembly burdensome and cumbersome when replacement of the filter media is required. Typical pleated, pocketed filter assemblies found in the prior art included a complicated arrangement of housings, wire reinforcing grids and filter media which render very difficult the operation of withdrawing the assembly from the air flow passageway and replacing the filter media therein. To overcome these drawbacks the filter assembly disclosed in U.S. Pat. No. 3,494,113 entitled "AIR FILTER ASSEMBLY AND SUB-ASSEMBLIES" by William L. Kinney was developed a removable, preferably closed-cell foam, cartridge adapted to be positioned within a housing in sealing engagement therewith and allowing the passage of air therethrough as it passes through the passageway. It included a replaceable, preferably reinforced resin-bonded, non-woven filter media adapted to be positioned within the cartridge in a pleated arrangement forming a plurality of downstream pockets in the air flow stream and covering the entire opening in the cartridge in sealing engagement therewith. The air filter media has two superimposed continuous layers of resin-bonded, non-woven material, a plurality of rigid, generally rectangular, separate, frame members positioned between the superimposed layers of non-woven material in a spaced, side-by-side relationship for aiding in the support of the filter media in the pleated, pocketed configuration, and means securing the superimposed layers of non-woven material together around the outside periphery of each of the frame members for holding the layers together and for holding the frame members in the aforesaid positions so that the filter media may bend in the spaces between the frame members for forming the pleated, pocketed arrangement. This type of assembly is complicated and expensive to construct and expensive to use and the filter material is neither reusable or washable.

OBJECTS OF THE INVENTION

It is, accordingly, an object of the present invention to provide a simple air filter and filter assembly for use in air cooling and heating forced air ventilation systems which provide easy removal and cleaning of the charged particle electrostatic filter material.

Another object of the present invention to provide a simple air filter and filter assembly for use in air cooling and heating forced air ventilation systems which provide easy removal and cleaning of the charged particle electrostatic filter material.

Another object of the present invention to provide such air filter and filter assembly, that is, of a low cost construction which is easily used in present day construction and retrofitting in existing air cooling and heating forced air ventilation systems.

It is a further object of the present invention to provide a pleated air filter assembly which is easily removed and has a washable filter media for use in air cooling and heating systems. Another object of the present invention is to provide a light-weight, low cost of construction a pleated filter and frame assembly which is easily used by the consumer and HVAC installers.

Another object of the present invention is that the pleated filter assembly be easy to construct and adapt to existing forced air heating and air conditioning systems as well as new ones and that the filter be easily accessible for replacement and cleaning by the consumer.

Another object of the present invention is that the inexpensive pleated filter assembly of the present invention may be used to replace more expensive electronic air filter cells in existing electronic filter systems such as those offered by Honeywell and Bryant shown in the cited references. It may be used to replace more expensive to use disposable filters and filter systems having the further advantage of reducing waste and pollution due to the disposal of such filters.

It is a further object of the present invention to provide an air filter apparatus that has a pleated filter that has more filtering area than that of the crosssectional area of the duct as found in flat panel type filters and more than that found in presently available wave form or corrugated filters. The filter assembly should also have a filter medium that is easily washable and can withstand aerodynamic forces generated by the fan. The filter device should be easily used with existing duct work presently found in the construction industry so as to avoid costly manufacturing and start-up costs.

Additional objects and advantages will be apparent to one skilled in the art and still other advantages and objects will become apparent hereinafter.

SUMMARY OF THE INVENTION

A filter apparatus for use in a forced air ventilation system. The filter apparatus having a first fan folded sheet of a washable first type of filter material, a second fan folded sheet of a second type of filter material, and fanfolds of the first and second fan folded sheets are substantially equally shaped and folded together such that the fanfolds of the first and second fan folded sheets are interdigitated to form a filter material assembly. The first type of filter material is preferably an electrostatically self-charging washable material and the second type of filter material is preferably disposable and contains activated charcoal. The first filter material is preferably a woven polypropylene and the first fan folded sheet preferably has heat sealed finished edges.

A more particular embodiment of the present invention includes the filter material assembly removably disposed in a removable rectangular filter frame for mounting the filter material assembly in the forced air system. The filter frame has four substantially perpendicular top, bottom, and two opposed side walls between an open front end and an open back end and at least one crank shaft rotatably disposed between the side walls and having cranks that are engageable with and substantially conforming to the fanfolds of the filter material assembly. The crank shaft preferably has an axis and a locking means to lock an angular position of the crank shaft about the axis such that the cranks that are engaged with the fanfolds of the filter material assembly. A more particular embodiment provides the locking means with a stop attached to and spaced a radial distance away from the crank shaft and the stop is engageable with a surface of the filter frame. The filter frame preferably further includes a front lip around a front periphery of and extending inward from the walls at the front end and a back lip around a back periphery of and extending inward from the walls at the back end and the surface is on one of the lips. The cranks and the fanfolds are preferably V-shaped.

Another more particular embodiment of the invention includes a housing for mounting the filter frame in the air flow passageway upstream of a blower in the forced air ventilation system. The housing is preferably integral with the air flow passageway and mounted between the blower and at least one inlet of a return duct of the air flow passageway. The housing may be mounted at an inlet of a return duct of the air flow passageway, in a wall, or in a ceiling. The housing may be mounted between structural cross members in a suspension or drop ceiling as well as a permanent ceiling.

The foregoing, and other features and advantages of the present invention, will become more apparent in the light of the following description and accompanying drawings.

BRIEF DESCRIPTION OF THE DRAWINGS

The foregoing aspects and other features of the invention are explained in the following description, taken in connection with the accompanying drawings where.

DETAILED DESCRIPTION OF THE INVENTION

Figure 1:
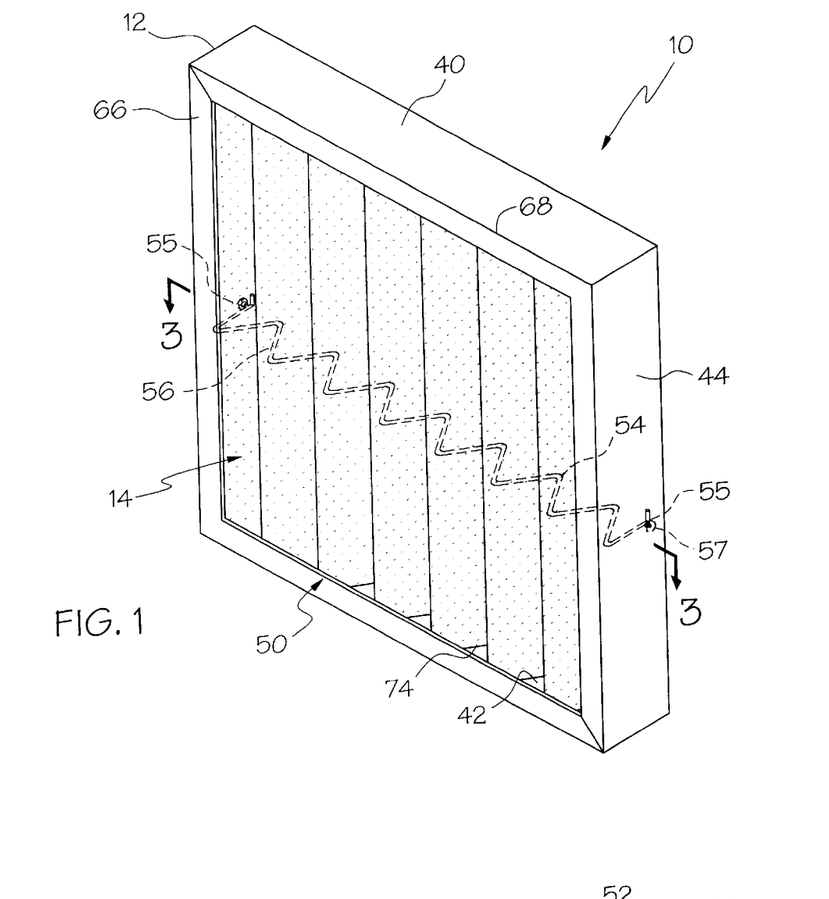
FIG. 1 is a perspective view of a filter material assembly mounted in a filter frame in accordance with an exemplary embodiment of the present invention.
Figure 2:
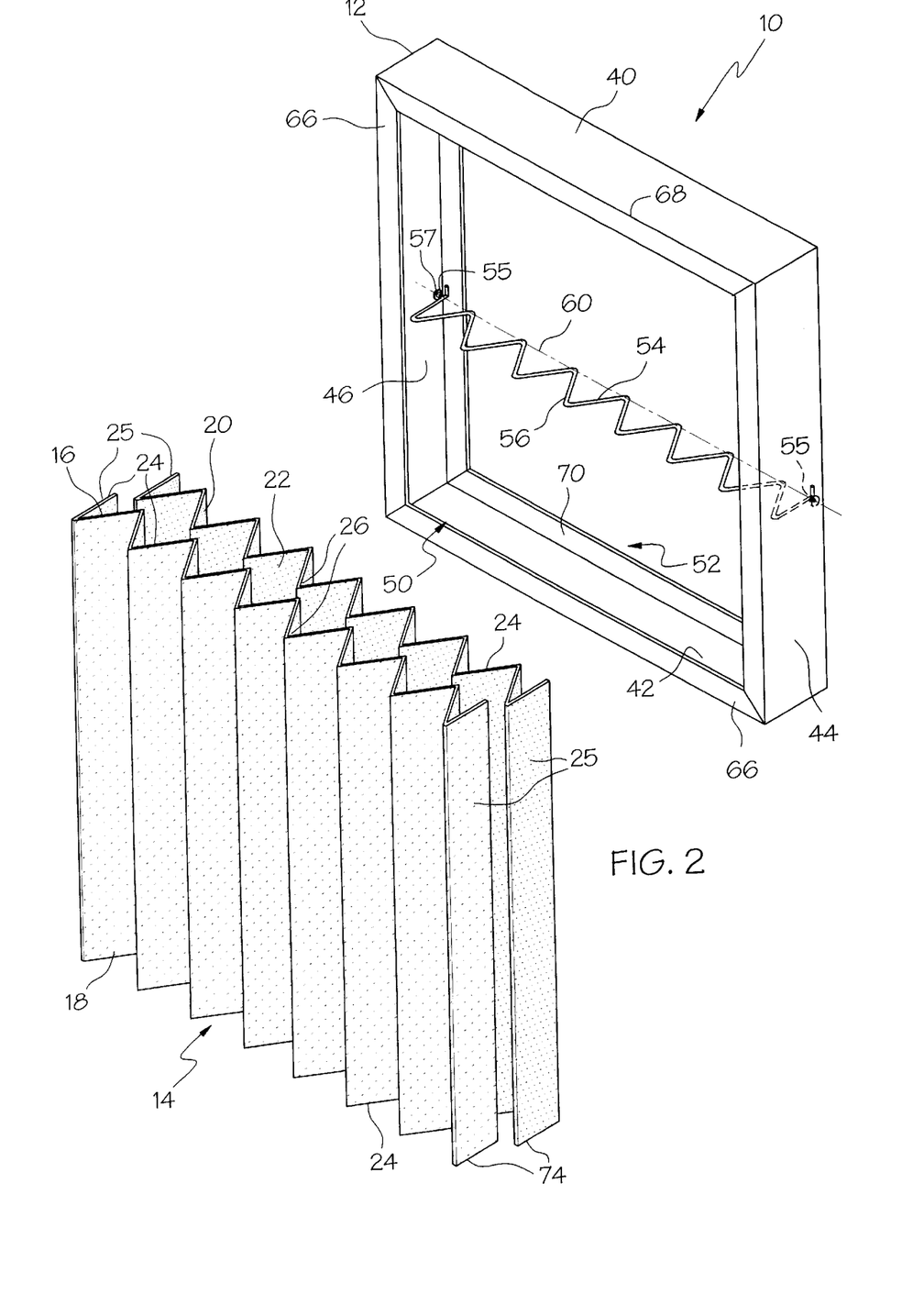
FIG. 2 is an exploded perspective view of the filter material assembly and filter frame in FIG. 1.

Illustrated in FIGS. 1 and 2 is a filter apparatus 10 for use in an air flow passageway 9 of a forced air ventilation system 11 (described below and illustrated in FIGS. 6–8) including a filter frame 12 which contains a filter material assembly 14 having a first fan folded sheet 16 of a washable first type of filter material 18 and a second fan folded sheet 20 of a second type of filter material 22. Fanfolds 26, between panels 25 of the first and second fan folded sheets 16 and 20, respectively are substantially equally shaped and folded together such that the fanfolds are interdigitated to form the filter material assembly 14 of the present invention. The first type of filter material 18 is preferably an electrostatically self-charging washable material and preferably a woven polypropylene. The second type of filter material 22 is preferably disposable and contains activated charcoal. The first fan folded sheet 16 is preferably made of woven polypropylene and preferably has heat sealed finished edges 24 around the periphery of the first fan folded sheet.

Figure 3:
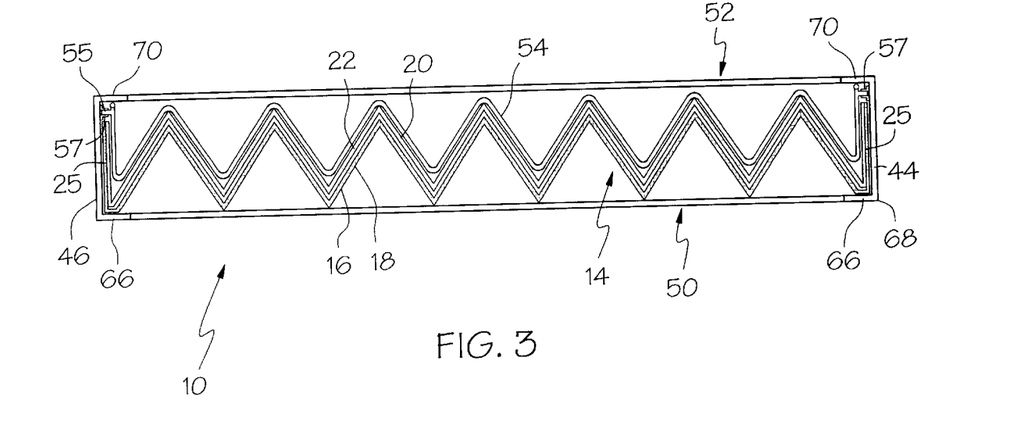
FIG. 3 is a cross-sectional view taken through 3—3 of the filter in FIG. 1.
Figure 3A:
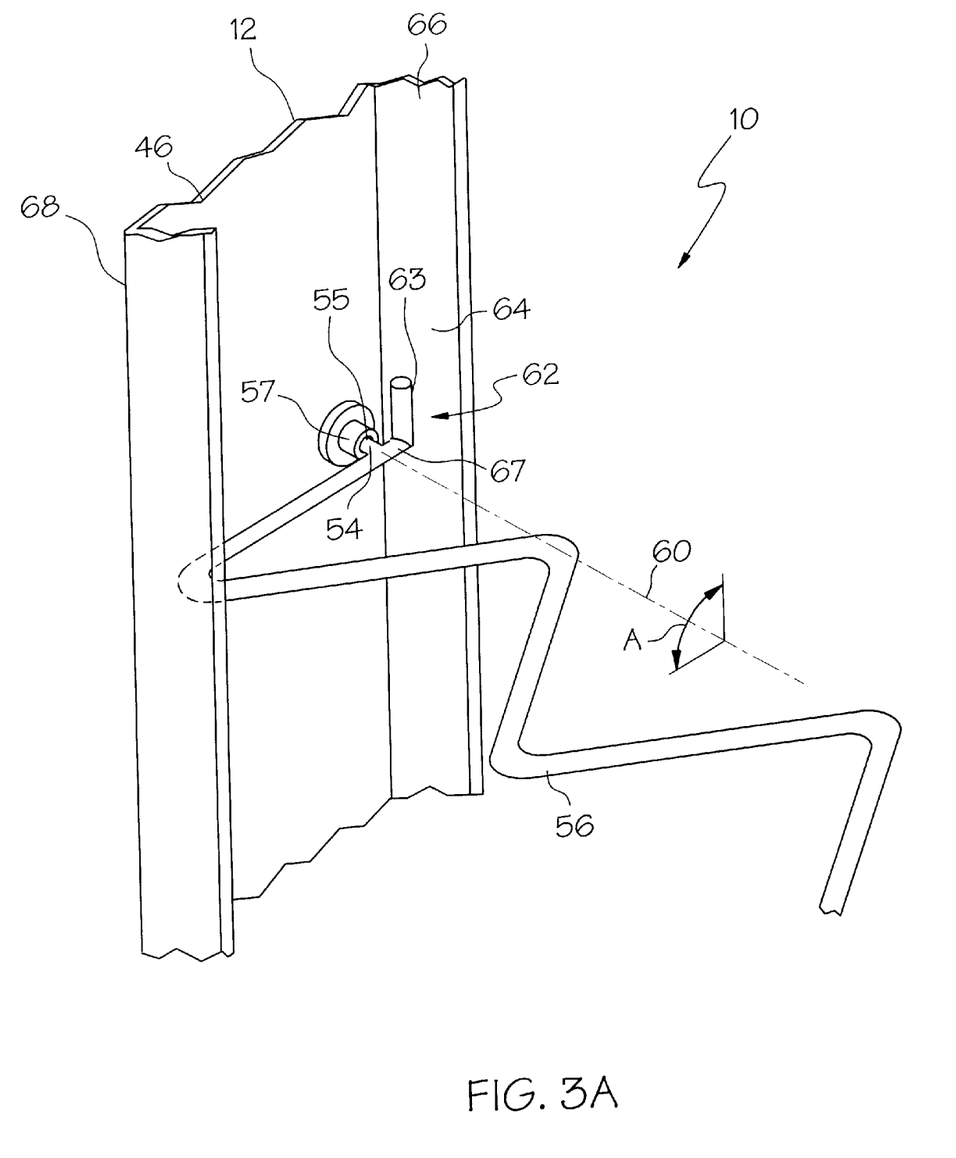
FIG. 3A is an enlarged perspective view of a crank shaft and a locking assembly to lock the crank shaft of the filter frame in FIG. 1.

The exemplary embodiment of the present invention shown in FIGS. 1–3 illustrates the filter material assembly 14 removably disposed in a removable rectangular filter frame 12 which is used to mount the filter material assembly in the forced air system 11. The filter frame 12 has four substantially perpendicular top, bottom, and two opposed side walls 40, 42, 44, and 46 respectively, between an open front end 50 and an open back end 52 and at least one crank shaft 54 rotatably disposed between the side walls and having cranks 56 that are engageable with and substantially conforming to the fanfolds 26 of the filter material assembly 14. The crank shaft 54 preferably has an axis 60 and a locking means 62, which is illustrated in greater detail in FIG. 3A, to lock the crank shaft in an angular position A about the axis such that the cranks 56 that are engaged with the fanfolds 26 of the filter material assembly 14. The cranks 56 and the fanfolds 26 are preferably V-shaped and the cranks serve to spread out the fanfolds to allow good airflow through the filter material assembly 14 and to maximize the effective filtering area of the filter material assembly. One exemplary means of rotatably mounting the crank shaft 54 between the side walls 44 and 46 is to mount crank shaft ends 55 in bushings 57 attached to the inside surfaces of the side walls 44 and 46. Disposing the crank shaft ends 55 through apertures in the sidewalls would also suffice. One example of such a locking means 62 is a stop 63 attached to and spaced a radial distance away from the crank shaft by a leg 67 off of the crack shaft 54 such that the stop is engageable with a surface 64 of the filter frame 12.

The filter frame 12 preferably further includes a front lip 66 around a front periphery 68 of and extending inward from the walls 40, 42, 44, and 46 respectively, at the front end 50 and a back lip 70 around a back periphery of and extending inward from the walls at the back end 52 and the surface 64 is on one of the lips. The lips 66 and 70 also serve to contain the filter material assembly 14 and assist the crank shaft 54 and cranks 56 in maintaining the shape and spacing of the fanfolds 26. The filter frame 12, lips 66 and 70 and the filter material assembly 14 are preferably sized so that the filter material assembly extends and the fanfolds 26 open up longitudinally across the filter frame between the top and bottom walls 40 and 42, respectively, and the fan folds extend transversely between the two opposed side walls 44 and 46, respectively, such that the edgers of the filter material assembly, which generally coincides in position with that of the heat sealed finished edges 24, are contained between the lips.

The heat sealed finished edges 24 serves to reinforce the sheet of the first type of filter material 18 so that it can help support its own weight and that of the entire filter material assembly 14 transversely within the filter frame 12. The filter material assembly 14 preferably includes last ones of panels 25 on the ends of the filter material assembly that tuck in between the crank shaft 54 and the side walls 44 and 46. This allows easily removal and installation of the filter material assembly 14 as well as providing a well positioned filter material assembly and prevents air from leaking around the filter material assembly.

Figure 4:
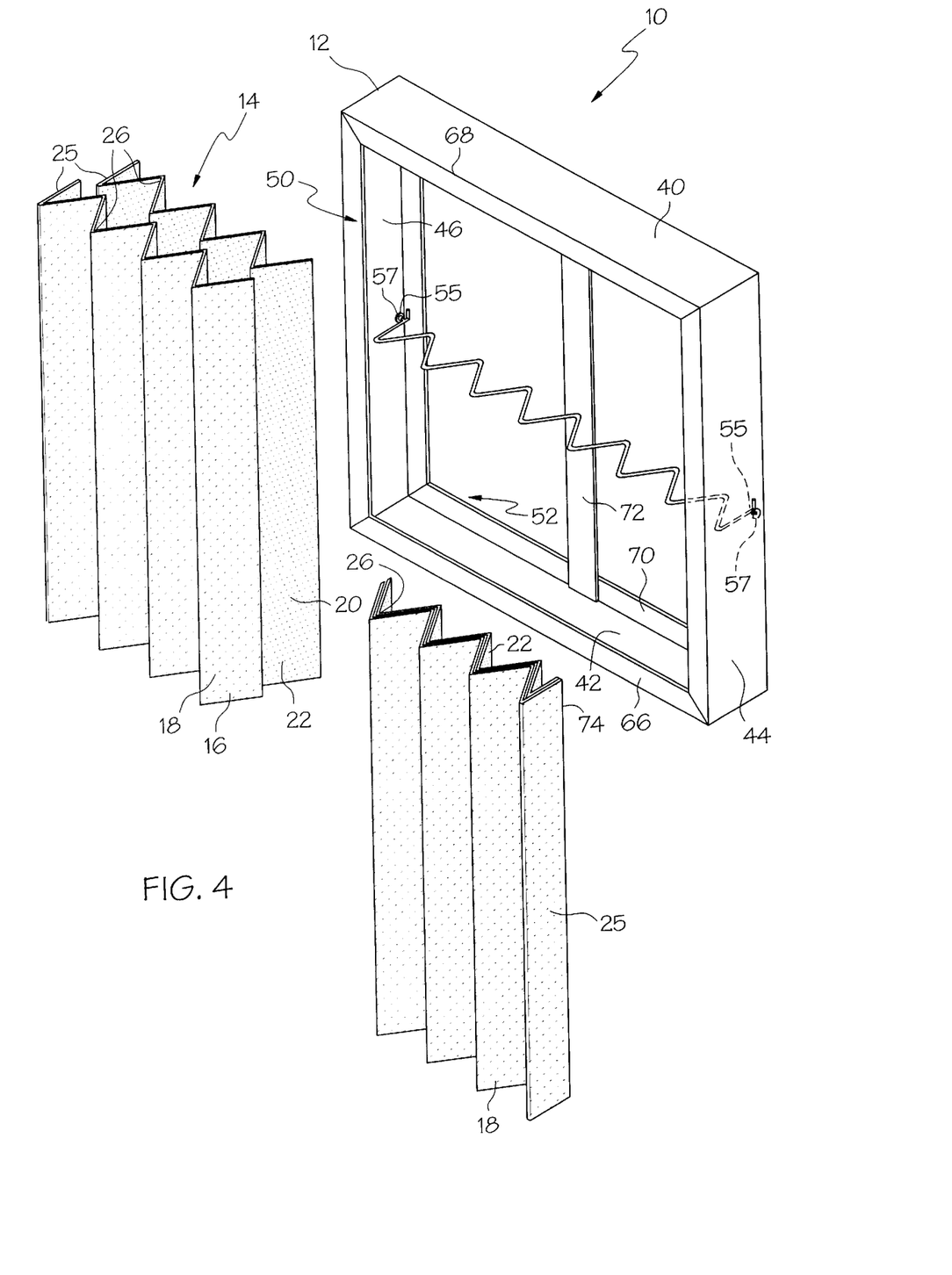
FIG. 4 is an exploded perspective view of an alternate filter material assembly mounted in a filter frame in accordance with another embodiment of the present invention.
Figures 5, 6, 7, 8:
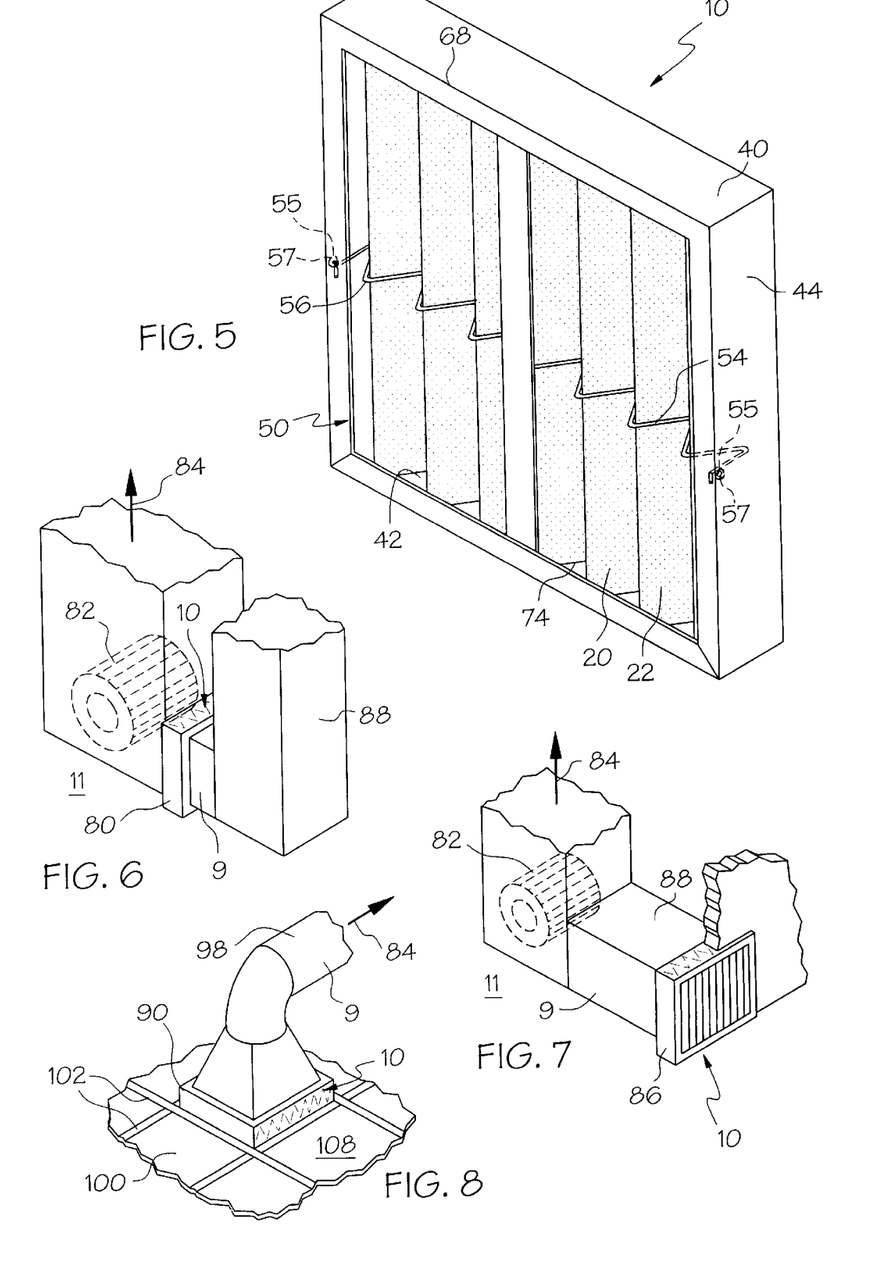
FIG. 5 is a perspective view of then alternate filter material assembly and filter frame in FIG. 4.
FIG. 6 is a perspective view of a filter apparatus mounted in a housing that is integral with the air flow passageway in accordance with a more particular embodiment of the present invention.
FIG. 7 is a perspective view of a filter apparatus mounted in a housing mounted in a wall in accordance with another more particular embodiment of the present invention.
FIG. 8 is a perspective view of a filter apparatus mounted in a housing in a ceiling in accordance with yet another more particular embodiment of the present invention.

An alternative embodiment of the present invention, illustrated in FIGS. 4 and 5, has at least two filter material assemblies 14 with two sets of the first and second fan folded sheets 16 and 20, respectively, which are substantially equally shaped and folded together such that the fanfolds 26 are interdigitated to form the two filter material assemblies 14. A rear lip member 72 extends transversely between the lip 66 along the top and bottom walls 40 and 42, respectively, to provide support for inner ends 74 of the two filter material assemblies 14. Such an embodiment may provide easier installation and removal of the two filter material assemblies 14.

FIGS. 6, 7 and 8 illustrate more particular embodiments of the present invention in HVAC installations or applications. FIG. 6 illustrates the filter apparatus 10 in an inline housing 80 disposed upstream of a blower 82 in the forced air ventilation system 11 for circulating air in an upstream direction indicated by arrow 84. The inline housing 80 typically is of a conventional construction used to house and seal electronic, electrostatic, and mechanical air cleaners in duct mounted or inline applications such as those illustrated in the Honeywell and Bryant pamphlets referenced above. The filter apparatus 10 may be self-sealing within the inline housing 80 or the housing may have a door or panel to lock and seal the inline housing against air ingestion from outside of the portion of the forced air ventilation system 11 containing the inline housing. The filter apparatus 10 may be used as a replacement for more expensive electronic air filter cells in housings of existing electronic filter systems such as those offered by Honeywell and Bryant shown in the cited references.

FIG. 7 illustrates the filter apparatus 10 disposed upstream of the blower 82 in a wall mount housing 86 at the end of a rectangular return duct 88 of the forced air ventilation system 11. Though not shown, a decorative grill or other covering is contemplated for use to cover the filter material assembly 14 for circulating air in an upstream direction indicated by arrow 84. FIG. 8 illustrates the filter apparatus 10 disposed upstream of the blower 82 in a ceiling mount housing 90 connected to a circular return duct 98, which is often flexible duct, at an end of the forced air ventilation system 11. The ceiling mount housing 90 is mounted in place of a ceiling panel 100 between cross members 102 of a truss or cross member drop ceiling suspension system 108. Though illustrated for use in a drop ceiling installation, permanent ceiling installations may be used as well because the filter material assembly 14 and the crank shaft 54 are easily accessible through the open front end 50 in order to remove the filter material assembly.

Figure 9:
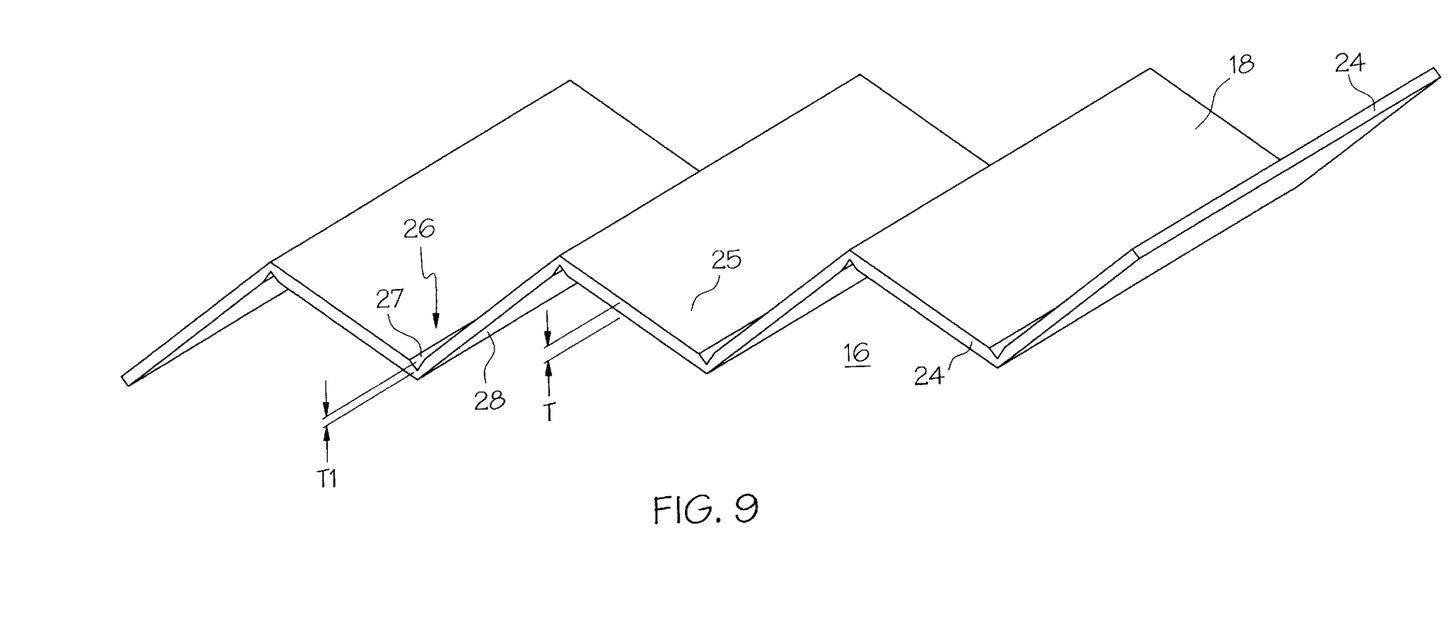
FIG. 9 is an enlarged perspective view of part of the fan folded sheet of polypropylene filter material in FIG. 2.

FIG. 9 illustrates a preferred embodiment of the fanfolds 26 of the first fan folded sheets 16 and a method of making the fanfolds. The fanfolds 26 are preferably made by heat sealing a portion T1 of the thickness T and doing so from opposite sides 28 on every other or alternating fanfolds. This method melts about half way through the woven polypropylene material 18 and forms the panels 25 and the alternating fanfolds 26. The second type of filter material 22 may also be formed in this manner.

A heat sealer may be used to form the fanfolds 26, one such heat sealer being available from the Vertrod Corporation of Brooklyn N.Y. which carries a line of Thermal Impulse Heat Sealing Machinery suitable for this process. Using such a machine the woven polypropylene material 18 is gripped by a pair of jaws and the material is heated. During the cooling process a wire is brought down against the material to form the heat sealed fanfold 26. Alternating fanfolds 26 are formed by the wire being brought down on and against opposite sides of the woven polypropylene material 18 for adjacent fanfolds. Exemplary settings used for this process are an even pressure across the jaws, in order to seal evenly, in a range of between 50 PSI and 60 PSI and a heating temperatures in a arrange between 250 degrees to 280 degrees F, and a heat impulses dial set at two allows the material only to crease thereby forming suitable fanfolds 26. A cool down temperature in the range of 75 degrees to 115 degrees F should be reached before removing material from heater bar assembly attached to bottom jaw of heat sealer by Vertrod such as Model 36EWS-WC-HOV-HD. During cool down cycle the pressure should remained applied until cool down temperature is reached. The material 18 should be uniform and laying flat for a proper seal and rigidity. Material must be melted on one side and then moved to another crease operations where the material is melted on an opposite side, this gives the polypropylene material 18 a spring like action. All perimeter edges should also be heat sealed for structural rigidity and integrity of the fanfolded sheet of material 18. Preferably, the entire length of each fanfold 26 is not heat sealed so that ends of the fanfold intersecting the heat sealed finished edges 24 are not heat sealed. The heat sealed fanfolds 26 between the panels 25 help form the fanfolded sheet and make it springy as well.

While the preferred embodiment of the invention has been described fully in order to explain its principles, it is understood that various modifications or alterations may be made to the preferred embodiment without departing from the scope of the invention as set forth in the appended claims.

What is claimed is:

1. A filter apparatus comprising:

a fan folded filter sheet made of a woven polypropylene material, said sheet comprising panels separated by heat sealed fanfolds between said panels of said sheet, heat sealed finished edges disposed around a periphery of said fan folded sheet, adjacent ones of said heat sealed fanfolds are heat sealed from opposite sides of said fan folded sheet, said filter sheet removably disposed in a removable rectangular filter frame for mounting said filter material assembly in a forced air ventilation system, said filter frame having four substantially perpendicular top, bottom, and two opposed side walls between an open front end and an open back end, and at least one crank shaft rotatably disposed between said side walls and having cranks that are engageable with and substantially conforming to said fanfolds of said filter material assembly.

2. The filter apparatus of claim 1, wherein said crank shaft has an axis and said filter apparatus further comprising a locking means to lock an angular position of said crank shaft about said axis such that said cranks that are engaged with said fanfolds of said filter material assembly.

3. The filter apparatus of claim 2, wherein said locking means comprises a stop attached to and spaced a radial distance away from said crank shaft and said stop is engageable with a surface of said filter frame.

4. The filter apparatus of claim 3, wherein said filter frame further comprises:

a front lip around a front periphery of and extending inward from said walls at said front end, a back lip around a back periphery of and extending inward from said walls at said back end, and said surface is on one of said lips.

5. The filter apparatus of claim 3, wherein said cranks and said fanfolds are V-shaped.

6. An air filtering system comprising:

an air flow passageway of a forced air ventilation system, a filter apparatus removably disposed across said air flow passageway for use in a forced air ventilation system, said filter apparatus comprising;

a fan folded filter sheet made of a woven polypropylene material, said sheet comprising panels separated by heat sealed fanfolds between said panels of said sheet wherein adjacent ones of said heat sealed fanfolds are heat sealed from opposite sides of said fan folded sheet, heat sealed finished edges disposed around a periphery of said fan folded sheet, said filter sheet removably disposed in a removable rectangular filter frame for mounting said filter material assembly in the forced air ventilation system, said filter frame having four substantially perpendicular top, bottom, and two opposed side walls between an open front end and an open back end, and at least one crank shaft rotatably disposed between said side walls and having cranks that are engageable with and substantially conforming to said fanfolds of said filter material assembly.

7. The filter apparatus of claim 6, wherein said crank shaft has an axis and said filter apparatus further comprising a locking means to lock an angular position of said crank shaft about said axis such that said cranks that are engaged with said fanfolds of said filter material assembly.

8. The filter apparatus of claim 7, wherein said locking means comprises a stop attached to and spaced a radial distance away from said crank shaft and said stop is engageable with a surface of said filter frame.

9. The filter apparatus of claim 8, wherein said filter frame further comprises:

a front lip around a front periphery of and extending inward from said walls at said front end, a back lip around a back periphery of and extending inward from said walls at said back end, and said surface is on one of said lips.

10. The filter apparatus of claim 9, wherein said cranks and said fanfolds are V-shaped.

* * * * *